(12) United States Patent  
Barany et al.

(10) Patent No.: US 7,126,939 B2  
(45) Date of Patent: Oct. 24, 2006

(54) PACKET-BASED CALLS IN A WIRELESS NETWORK

(75) Inventors: Peter A. Barany, McKinney, TX (US); Chandra S. Bontu, Nepean (CA); Shamim Akbar Rahman, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1031 days.

(21) Appl. No.: 09/737,888

(22) Filed: Dec. 15, 2000

(65) Prior Publication Data

US 2002/0034166 A1 Mar. 21, 2002

Related U.S. Application Data

(60) Provisional application No. 60/220,360, filed on Jul. 24, 2000.

(51) Int. Cl.
*H04L 12/36* (2006.01)
*H04Q 7/00* (2006.01)
*H04Q 7/28* (2006.01)
*H04Q 7/20* (2006.01)

(52) U.S. Cl. .................................................. 370/352

(58) Field of Classification Search ........ 370/328–329, 370/437, 468, 230, 310, 336–337, 341, 442, 370/352–356; 455/452.1, 466
See application file for complete search history.

(56) References Cited

U.S. PATENT DOCUMENTS

| | | | |
|---|---|---|---|
| 5,396,539 A | | 3/1995 | Slekys et al. |
| 5,930,721 A | * | 7/1999 | Fried et al. .................. 455/466 |
| 6,031,832 A | * | 2/2000 | Turina .......................... 370/348 |
| 6,167,248 A | * | 12/2000 | Hamalainen et al. ........ 455/403 |
| 6,204,808 B1 | * | 3/2001 | Bloebaum et al. ..... 342/357.07 |
| 6,385,179 B1 | * | 5/2002 | Malcolm et al. ............. 370/329 |
| 6,512,818 B1 | * | 1/2003 | Donovan et al. ........ 379/88.18 |
| 6,594,241 B1 | * | 7/2003 | Malmlof ...................... 370/329 |
| 6,601,099 B1 | * | 7/2003 | Corneliussen ............... 709/224 |
| 6,608,832 B1 | * | 8/2003 | Forslow ...................... 370/353 |
| 6,671,509 B1 | * | 12/2003 | Tanaka et al. .............. 455/419 |
| 6,678,735 B1 | * | 1/2004 | Orton et al. ................. 709/230 |
| 6,707,813 B1 | * | 3/2004 | Hasan et al. ................. 370/356 |
| 6,721,278 B1 | * | 4/2004 | Rimhagen et al. .......... 370/252 |
| 6,804,224 B1 | * | 10/2004 | Schuster et al. ............. 370/352 |
| 6,865,165 B1 | * | 3/2005 | Huttunen .................... 370/329 |

(Continued)

FOREIGN PATENT DOCUMENTS

EP 1 005 243 A1 5/2000

(Continued)

OTHER PUBLICATIONS

Peter Rysavy, *Paper: General Packet Radio Service (GPRS)*, Rysavy Research, for PCS Data Today Online Journal, pp. 1-5 (Sep. 30, 1998).

(Continued)

*Primary Examiner*—Chi Pham
*Assistant Examiner*—Ronald Abelson
(74) *Attorney, Agent, or Firm*—Trop, Pruner & Hu, P.C.

(57) ABSTRACT

A communications system includes a wireless access network that is coupled to a packet-based data network. Packet-based calls may be established between a mobile station coupled to the wireless access network and a network endpoint coupled to the data network. For efficient call setup and call release, call control signaling, such as Session Initiation Protocol (SIP) messages and Resource Reservation Protocol (RSVP) messages, are carried in traffic channels over the wireless access network.

31 Claims, 10 Drawing Sheets

U.S. PATENT DOCUMENTS

| | | |
|---|---|---|
| 6,898,194 B1 * | 5/2005 | Vedrine ...................... 370/329 |
| 2001/0030949 A1 * | 10/2001 | Molno et al. ................ 370/329 |
| 2003/0053447 A1 * | 3/2003 | Thompson .................. 370/352 |

FOREIGN PATENT DOCUMENTS

| | | |
|---|---|---|
| EP | 1 021 017 A2 | 7/2000 |
| EP | 1 045 559 A1 | 10/2000 |
| WO | WO 95/12936 | 5/1995 |
| WO | WO 99/16266 | 4/1999 |
| WO | WO 01/91499 | 11/2001 |

OTHER PUBLICATIONS

Paul Meche, *UWC-136 RTT Update*, Conference Call, TR45.3/98.04.06.07R4 (TR45/98.03.19R6), Universal Wireless Communications Consortium, pp. 1-5, 177-180, 198, 212-214, and 242-250 (Feb. 26, 1999).

Paul Meche, *Evolution of TDMA to 3G*, Universal Wireless Communications Consortium, pp. 1-19, dated at least as early as Jun. 7, 1999.

*UWC-136: TDMA'S Migration to Third Generation*, Universal Wireless Communications Consortium, pp. 1-2, printed from web site http://uwcc.org/ctiaw98/backg.htm, dated as early as Jun. 6, 1999.

*Universal Wireless Communications Consortium (UWCC) Announces UWC-136, the TDMA IS-136 Soultion for Third Generation*, p. 1 (Feb. 23, 1998).

*UWC-136: TDMA'S Evoluntionary Path to Third Generation*, Question & Answers, pp. 1-2, dated at least as early as Jun. 6, 1999.

John Scourias, *Overview of the Global System for Mobile Communications*, pp. 1-15, printed from web site http://www.gsmdata.com/overview.htm (Oct. 14, 1997).

*TR 45 TIA/EIA-136-121-A Draft Text*, pp. 1-26, Digital Control Channel Layer 1, (Nov. 20, 1998).

*TR 45 TIA/EIA-136-123-A Draft Text*, pp. i-xii, 1, 45, Digital Control Channel Layer 3, (Nov. 20, 1998).

Nortel Networks, (Peter A. Barany, Eric N. Johnson, Shavantha Kularatna), *UWC-136 Edge Control Channel Options*, UWCC.GTF.PDFG/99.02.09, pp. 1-17 (Feb. 9, 1999).

Nortel Networks, (Peter A. Barany, Eric N. Johnson, Shavantha Kularatna), *Mechanisms for Implementing UWC-136 Edge Control Channels on a 200 KHZ RF Carrier*, UWCC.GTF.PDFG/99.03.09R1, pp. 1-27 (Mar. 9, 1999).

Marc Grant, *PDFG-RF Group Meeting Summary*, UWCC.GTF.PDFG/99.04.13, pp. 1-16 (Apr. 13, 1999).

Nortel Networks, (Peter A. Barany, Eric N. Johnson, Shavantha Kularatna and Shamim Akbar Rahman), *Impact on Maximum Cell Size of Robustness of the GSM SCH Burst Deployed in "Effective" 3/9 and 4/12 Frequency Reuse Patterns with Synchronized UWC-136 Edge 200 KHZ Base Stations*, UWCC.GTF.PDFG/99.04.13.26R2, pp. 1-14 (Apr. 13, 1999).

Nortel Networks, (Peter A. Barany, Eric N. Johnson, Shavantha Kularatna and Shamim Akbar Rahman), *Proposed New Optional Information Element for 30 KHZ DCCH Structure Messag and Algorithm for Rapid Acquisition of Edge Compact PFCCH and PSCH*, UWCC.GTF.PDFG/99.05.05, pp. 1-4 (May 5, 1999).

Nortel Networks, (Peter A. Barany, Eric N. Johnson), *Concept Proposal for GPRS-136HS Edge* ETSI STC SMG2, Revision 1.0, TDoc SMG2 530/99, Agenda Item 4.3, 6.2, 7.2.6.6, pp. 1-22 (May 31-Jun. 4, 1999).

M. Handley, et al., *SIP: Session Initiation Protocol*, RFC 2543, pp. 1-153 (Mar. 1999).

S. Deering, et al., *Internet Protocol, Version 6 (IPv6) Specification*, RFC 2460, pp. 1-36 (December 1998).

* cited by examiner

PACKET-BASED CALLS IN A WIRELESS NETWORK

CROSS-REFERENCE TO RELATED APPLICATIONS

This application claims the benefit under 35 U.S.C. § 119(e) to U.S. Provisional Application Ser. No. 60/220,360, entitled "Packet-Based Calls in a Wireless Network," filed Jul. 24, 2000.

TECHNICAL FIELD

The invention relates to packet-based calls in wireless networks.

BACKGROUND

Mobile communications systems, such as cellular or personal communications services (PCS) systems, are made up of a plurality of cells. Each cell provides a radio communications center in which a mobile unit establishes a call with another mobile unit or wireline unit connected to a public switched telephone network (PSTN). Each cell includes a radio base station, with each base station connected to a base station controller or mobile switching center that controls processing of calls between or among mobile units or mobile units and PSTN units.

Various wireless protocols exist for defining communications in a mobile network. One such protocol is a time-division multiple access (TDMA) protocol, such as the TIA/EIA-136 standard provided by the Telecommunications Industry Association (TIA). With TIA/EIA-136 TDMA, each channel carries a frame that is divided into six time slots to support multiple (3 or 6) mobile units per channel. Other TDMA-based systems include Global System for Mobile (GSM) communications systems, which use a TDMA frame divided into eight time slots (or burst periods).

Traditional speech-oriented wireless systems, such as the TIA/EIA-136 and GSM TDMA systems, utilize circuit-switched connection paths in which a line is occupied for the duration of the connection between a mobile unit and the mobile switching center. Such a connection is optimum for communications that are relatively continuous, such as speech. However, data networks such as local area networks (LANs), wide area networks (WANs), and the Internet use packet-switched connections, in which communication between nodes on a communications link is by data packets. Each node occupies the communications link only for as long as the node needs to send or receive data packets. With the rapid increase in the number of cellular subscribers in conjunction with the rising popularity of communications over data networks such as intranets or the Internet, a packet-switched wireless data connection that provides convenient and efficient access to data networks, electronic mail, databases, and other types of data has become desirable.

Several packet-switched wireless connection protocols have been proposed to provide more efficient connections between a mobile unit and a data network. One such protocol is the General Packet Radio Service (GPRS) protocol, which complements existing GSM systems. Another technology that builds upon GPRS is the Enhanced Data Rate for Global Evolution (EDGE) technology, which offers even higher data rates. The enhancement of GPRS by EDGE is referred to as Enhanced GPRS (EGPRS). Another variation of EGPRS is the EGPRS COMPACT technology.

The packet-switched wireless connection protocols provide efficient access to traditional data networks, such as the Internet, LANs, WANs, and the like. A growing use of such data networks is for voice and other forms of real-time or streaming communications (such as video, audio and video, and so forth). Various protocols have been defined to enable such real-time or streaming communications over the data networks, which are often packet-switched networks. A popular packet-switched network is the Internet Protocol (IP) network.

To establish calls over IP networks, Session Initiation Protocol (SIP), H.323, or other types of messages can be used. Once a call is established, other communications protocols are used to provide for reliable real-time communications. Such other protocols include the Real-Time Protocol (RTP), Resource Reservation Protocol (RSVP), and others. However, with the relatively large size of typical messages, such as SIP, RSVP, or H.323 messages, unacceptably large delays may be introduced when attempting to establish a packet-based call session over a wireless network.

As wireless networks continue to evolve, a need exists for improved methods and mechanisms to enable voice and other forms of real-time or streaming communications over packet-switched wireless networks.

SUMMARY

In general, according to one embodiment, a method of providing a call in a wireless network comprises sending an identifier to identify the call as a packet-switched call and communicating control signaling in traffic channels of the wireless network to establish the packet-switched call.

Some embodiments of the invention may include one or more of the following advantages. An efficient mechanism is provided to communicate control signaling associated with packet-switched calls over a wireless network. Such efficiency enables relatively fast call set up and release. By reducing the amount of time needed for various call services, such as call setup, call release, and supplementary services, user convenience is enhanced and more efficient usage of the available bandwidth in a wireless network may be provided.

Other features and advantages will become apparent from the following description, the drawings, and the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
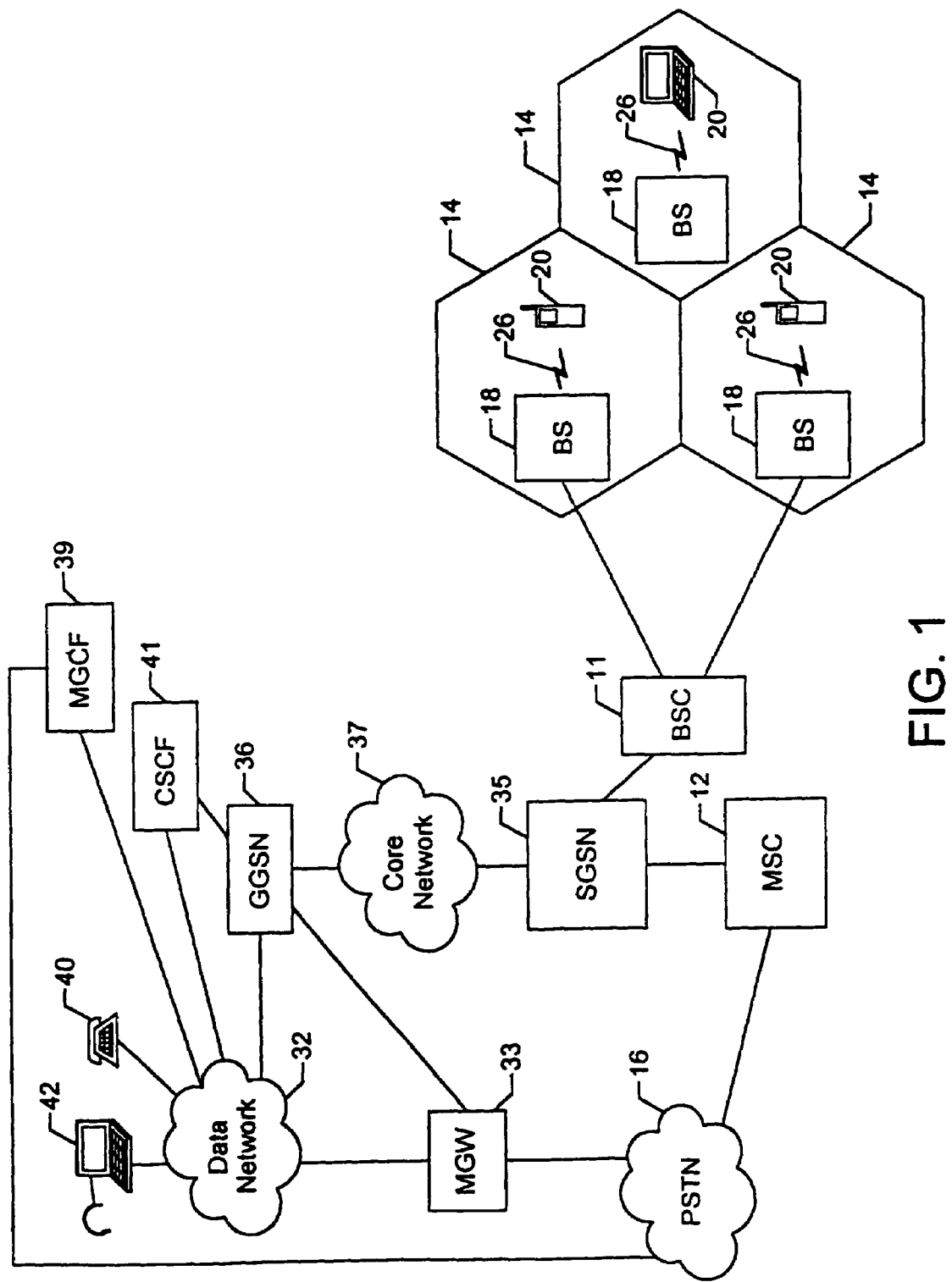
FIG. 1 is a block diagram of an embodiment of a communications system in accordance with an embodiment.

Referring to FIG. 1, a mobile communications system 10, which may be a cellular or a personal communications services (PCS) system, includes a plurality of cells 14 each including a base station 18. The base stations 18 are capable of communicating with mobile stations 20 (e.g., mobile telephones, mobile computers, personal digital assistants, or other types of mobile units) over radio frequency (RF) carriers 26. Groups of base stations 18 are connected to corresponding base station controllers (BSCs) 11. For packet-switched communications, the BSCs 11 interact with a data traffic service node 35, which in one embodiment is a serving GPRS (General Packet Radio Service) support node (SGSN). In further embodiments, the BSCs 11 may be omitted, with the base stations 18 connected to the SGSN 35.

Although reference is made to cells 14 in this description, embodiments of the invention are equally applicable to other cell segments (e.g., cell sectors). As used here, "cell segment" generally refers to a cell, a cell sector, or any other division of a cell.

The SGSN 35 can be coupled to a mobile switching center (MSC) 12 that provides circuit-switched wireless communications. Although not shown, the MSC 12 is coupled to a network of cells, which can be the group of cells 14 or another group of cells.

Packet-switched data services may proceed using channels defined by an Enhanced GPRS (EGPRS) protocol or an EGPRS COMPACT protocol, which are set by the European Telecommunications Standards Institute (ETSI). As used here, reference to a "GPRS system" refers to either an EGPRS or EGPRS COMPACT system. Packet-switched data services can also be provided by code-division multiple access (CDMA) systems, such as Wideband CDMA systems (W-CDMA) or CDMA-2000 systems. Circuit-switched services in the wireless network may be according to Global Systems for Mobile (GSM) or TIA/EIA-136 , both time-division multiple access (TDMA) technologies. Alternatively, circuit-switched services may also be according to a CDMA protocol.

The SGSN 35 controls the establishment, processing, and termination of packet-switched communications with mobile stations 20 in the cells 14 according to the EGPRS or EGPRS COMPACT protocol. Also in accordance with GPRS, the SGSN 35 communicates over a core network 37 with a gateway GPRS support node (GGSN) 36, which provides an interface to a packet-switched data network 32. Various types of data services, such as electronic mail, web browsing, file transfer, and so forth, are available over the packet-switched data network 32. An example of a public data network includes the Internet, while examples of private data networks include local area networks (LANs) or wide area (WANs) that may be part of various enterprises (e.g., business, universities, and so forth). Although the illustrated embodiment shows the SGSN 35 and the GGSN 36 as the nodes providing for packet-switched services for wireless devices such as mobile stations 20, other types of nodes according to other technologies may be employed in further embodiments.

In addition to conventional data services, such as electronic mail, web browsing, file transfer, and so forth, that are available over the data network 32, voice and other forms of real-time data communications (e.g., audio/video streaming) are also possible over the data network 32. Such voice or other real-time data communications may involve terminals 40 and 42 that include network interface controllers for communicating over the data network 32. In one example, the terminal 40 is a data network-enabled telephone, such as the i2004 telephone from Nortel Networks Ltd. Such data network-enabled telephones convert voice and other types of real-time data into packets that are communicated over the data network 32. An example of the terminal 42 is a computer that is fitted with voice processing capabilities and a soft phone routine, such as the i2050 product from Nortel. Thus, users can communicate with each other over the data network 32 without going through traditional circuit-switched networks such as the PSTN 16.

Terminals on the packet-switched data network 32 can also communicate with telephone devices connected to a public switched telephone network (PSTN) 16 through a media gateway 33 coupled between the PSTN 16 and the packet-switched data network 32. The media gateway 33 converts between packet-switched speech frames and circuit-switched speech frames.

A media gateway control function (MGCF) module 39 converts between packet-switched and circuit-switched signaling in a call session between terminals on two sides of the media gateway 33. For example, the MGCF module 39 can generate Signaling System No. 7 (SS7) signaling to the PSTN 16. Additionally, the communications system includes a call state control function (CSCF) module 41 that provides overall call control for a packet-based communications session. In some embodiments, the CSCF module 41 is a SIP proxy or server that receives call requests on behalf of other entities, resolves logical addresses or identifiers in the call requests, and forwards the call requests to the intended destination.

One example of the data network 32 is a connectionless, packet-switched network such as an Internet Protocol (IP) network. IP is described in Request for Comments (RFC) 791, entitled "Internet Protocol," dated September 1981. Other versions of IP, such as IPv6, or other packet-switched standards may also be utilized in further embodiments. A version of IPv6 is described in RFC 2460, entitled "Internet Protocol, Version 6 (IPv6) Specification," dated December 1998.

Packet-switched networks such as IP networks communicate with packets, datagrams, or other units of data over the networks. Unlike circuit-switched networks, which provide a dedicated end-to-end channel portion (e.g., a time slot) for the duration of a call session, a packet-switched network is based on a connectionless internetwork layer. Packets or other units of data injected into a packet-switched data network may travel independently over any network (and possibly over different networks) to a destination point. The packets may even arrive out of order. Routing of the packets is based on one or more addresses carried in each packet.

Another type of packet-based network is a connection-oriented, packet-based network, such as an Asynchronous Transfer Mode (ATM) or a Frame Relay network. In a connection-oriented packet-based network, a virtual circuit or connection is established between two endpoints so that packets are delivered in the same order in which they were transmitted.

To establish a call session over a packet-switched network such as an IP network, control messages according to a Session Initiation Protocol (SIP) may be used. SIP is part of the multimedia data and control architecture from the Internet Engineering Task Force. (IETF). A version of SIP is described in RFC 2543, entitled "SIP: Session Initiation Protocol," dated August 1999. SIP may be used to initiate call sessions as well as to invite members to a session that may have been advertised by some other mechanism, such as electronic mail, news groups, web pages, and other mechanisms. Other protocols in the IETF multimedia and control architecture include the Resource Reservation Protocol (RSVP), as described in RFC 2205, for reserving network resources; in the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Description Protocol (SDP), as described in RFC 2327, for describing multimedia sessions; and the Session Announcement Protocol (SAP), as described in RFC 2974, for advertising multimedia sessions by multicast.

Other standards may be employed in further embodiments for establishing packet-switched calls over the data network 32. Such other standards may be any other standard that provides for interactive, real-time voice or other streaming communications over the data network 32. One alternate standard is the H.323 Recommendation from the International Telecommunication Union (ITU). In addition, in further embodiments, protocols defining control signaling for call sessions over ATM or other connection-oriented data networks 32 may be employed.

As used here, a "call session" refers generally to either a voice, video, or other real-time, interactive session established between two or more network elements coupled to the data network 32. The network elements may include a terminal coupled to the data network 32, such as the terminal 40 or 42. Another terminal that may be involved in the call session is a telephone coupled to the PSTN 16. Yet another terminal that may be involved in the call session over the data network 32 is one of the mobile stations 20 that communicate over the wireless infrastructure provided by the base stations 18 and SGSN 35. As used here, a "packet-switched call" or "packet-switched call session" refers to a call session established over the packet-switched data network 32 that involves the exchange of real-time data, such as voice, video, and the like. More generally, a "packet-based call" or "packet-based call session" refers to a call session established over any type of packet-based data network 32 (either a connectionless or connection-oriented network). In the ensuing description, reference is made to packet-switched calls. However, in further embodiments, any type of packet-based calls may be performed.

One technique for a mobile station 20 to establish a packet-switched call over the data network 32 with another terminal (e.g., 40, 42) is to send call control signaling according to the call control protocol used on the data network 32 and enabled by the terminals 40, 42 and media gateway 33. One such call control protocol is SIP. Other packet-switched call control protocols, such as H.323, may be employed in further embodiments. The call control signaling is communicated through the radio access network (including the base stations 18, base station controllers 11, and the SGSN 35). The base stations 18 and base station controllers 11 can collectively be referred to as a radio network controller (RNC). The radio access network may be a GSM/EDGE radio access network (GERAN) that operates according to the EGPRS or EGPRS COMPACT protocol. Alternatively, the radio access network can be a UMTS (Universal Mobile Telecommunication System) Terrestrial radio access network (UTRAN) according to the W-CDMA protocol.

Call control signaling communicated through the radio access network is forwarded by the GGSN 36 to the CSCF module 41. The call control signaling is received by the CSCF module 41 and a call session is established after a call setup procedure is performed. If the destination terminal is coupled to the PSTN 16, then the MGCF module 39 is also involved in the call setup procedure.

In a typical SIP call setup sequence, the message size of the SIP call control messages may be quite large, since the SIP messages are text or ASCII-based and are carried in IP packets that include IP headers as well as UDP (User Datagram Protocol) headers. UDP is described in RFC 768, entitled "User Datagram Protocol," dated August 1980, and provides a transport layer for managing connections between network elements over an IP network.

Due to the relatively large message sizes of SIP messages to perform call setup, call release, and supplementary services, an efficient mechanism for communicating such messages or performing call setup, call release, and supplementary services over the radio access network is provided in accordance with some embodiments of the invention. In one embodiment, the SIP call setup time over the wireless network is comparable to the call setup time typically experienced in a GSM circuit-switched wireless network.

In one embodiment, new MS (mobile station) codes are defined for the random access channel (RACH), packet random access channel (PRACH), and the COMPACT packet random access channel (CPRACH). RACH, PRACH, or CPRACH is used by a mobile station to request access to the radio access network. Different ones of the RACH, PRACH and CPRACH channels are employed depending on the type of radio access network. RACH is used in a GSM radio access network, PRACH is used in an EGPRS radio access network, and CPRACH is used in an EGPRS COMPACT radio access network. The MS code can be 8 bits or 11 bits wide, depending on which of RACH, PRACH, and CPRACH is used.

In one embodiment, 8-bit MS codes that can be carried in a RACH burst include a code AF[8:1], representing code $AF_8 AF_7 AF_6 AF_5 AF_4 AF_3 AF_2$ and $AF_1$, for originating AMR (adaptive multi-rate) full-rate packet-switched speech calls, a code AH[8:1] for originating AMR half-rate packet-switched speech calls, a code BF[8:1] to answer a full-rate packet-switched paging speech call, and a code BH[8:1] to answer an AMR half-rate packet-switched paging speech call.

Similar 8-bit MS codes can be defined for PRACH, and include a code CF[8:1] for originating an AMR full-rate packet-switched speech call, a code CH[8:1] for originating an AMR half-rate packet-switched speech call, a code DF[8: 1] for answering an AMR full-rate packet-switched paging speech call, and a code DH[8:1] for answering an AMR half-rate packet-switched paging speech call. Similarly, 11-bit MS codes can be defined for PRACH and CPRACH. Two different training sequences TS1 and TS2 can be used for different modulation schemes over the Um link between the mobile stations 20 and base stations 18. The 11-bit MS codes defined are TS1 EF[8:1] or TS2 GF[8:1] for originating an AMR full-rate packet-switched speech call, TS1 EH[8:1] or TS2 GH[8:1] for originating an AMR half-rate packet-switched speech call, TS1 FF[8:1] or TS2 HF[8:1] for answering an AMR full-rate packet-switched paging speech call, and TSl FH[8:1] or TS2 HH[8:1] for answering an AMR half-rate packet-switched paging speech call.

The above codes are provided for illustration purposes only, since different codes can be defined to provide different services in various embodiments.

A mobile station 20 communicates a RACH message to perform a channel request to either originate a call or to answer a page. The channel request can also be performed with a PRACH or CPRACH burst, depending on the type of system. As used here, a "random access channel" refers generally to any one of RACH, PRACH, or CPRACH. If the desired call is a packet-switched call, then the RACH message contains one of the codes defined above. In response to a RACH message containing a packet-switched call code, the radio network controller or the SGSN 35 assigns a predetermined logical channel combination and physical channel to perform the packet-switched call. The logical channel combination is described below in connection with FIG. 2, and a physical channel refers to a frame time slot and carrier frequency that is assigned to a mobile station.

Figure 6:
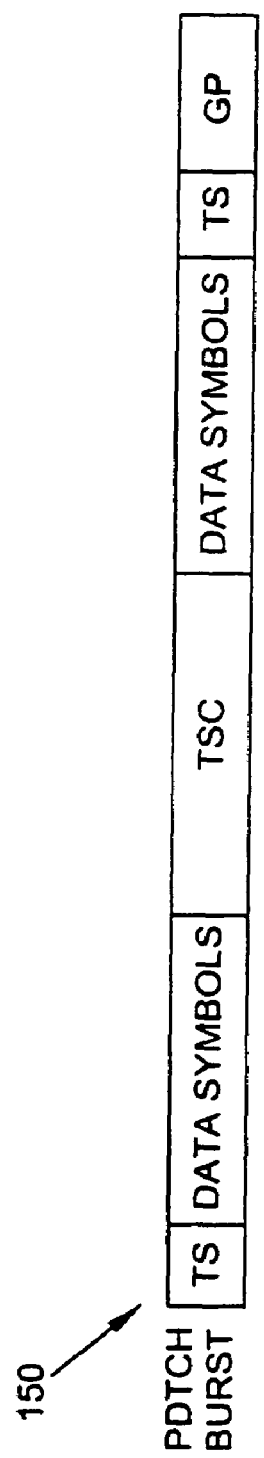
FIG. 6 illustrates a packet data traffic channel (PDTCH) for carrying packet-switched call control signaling in accordance with an embodiment.

In accordance with some embodiments, SIP messages (and other call control messages) are carried in dedicated packet data traffic channel (PDTCH) bursts, as defined by EGPRS or EGPRS COMPACT. An example PDTCH burst 150 is shown in FIG. 6. By using PDTCH mapped to a dedicated physical channel to carry SIP messages, the time for the packet-switched call setup sequence is comparable to the time of a GSM circuit-switched call setup sequence. A further advantage of using PDTCH mapped to a dedicated physical channel to carry SIP messaging is that the messages are transparent to the radio access network, such as the GERAN. In other words, the SIP messages carried in dedicated PDTCH bursts are treated as traffic and not processed by the radio access network. A physical channel is "dedicated" if it is assigned for use by a given mobile station, and the physical channel is not shared with another mobile station while it is assigned to the given mobile station.

Figure 2:
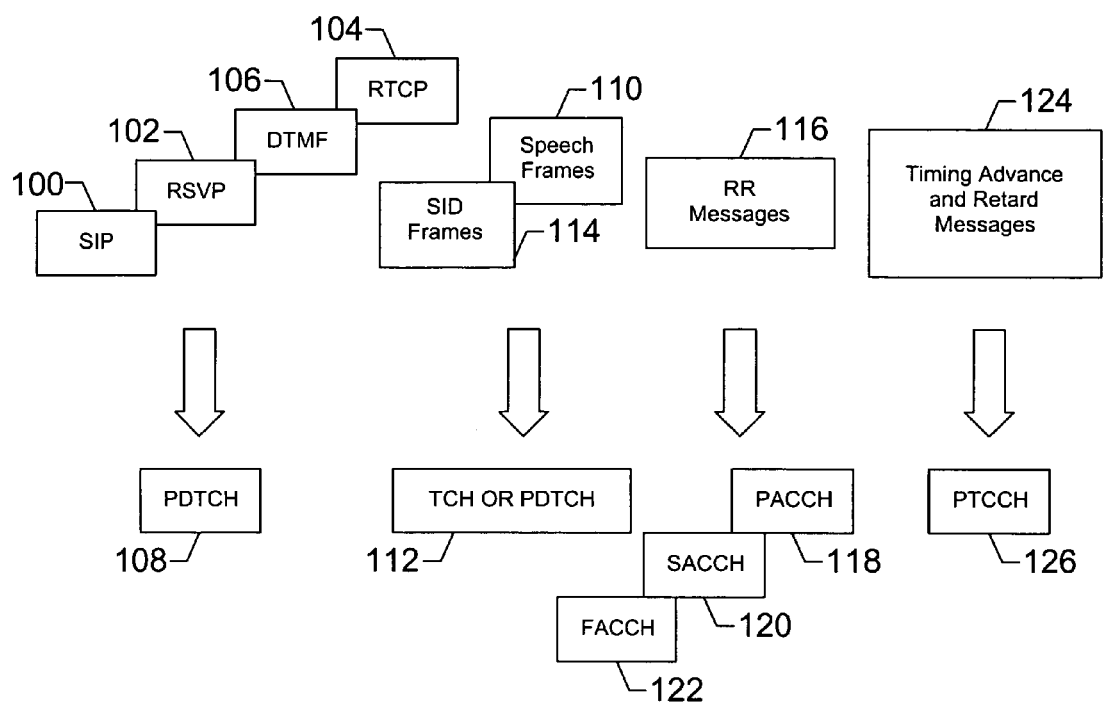
FIG. 2 illustrates the assignment of a logical channel combination to carry control messages in accordance with an embodiment.

Referring to FIG. 2, in accordance with one embodiment, a new logical channel combination in the GERAN is defined. The logical channel combination includes:

TCH+FACCH+SACCH+PDTCH+PACCH+PTCCH.

TCH is the logical channel (mapped to the same dedicated physical channel as PDTCH) used to carry speech bearer data for the optimized voice bearer. FACCH is the fast associated control channel. SACCH is the slow associated control channel. PACCH is the packet associated control channel. PTCCH is the packet timing control channel. As noted above, SIP messages 100, along with other control messages such as RSVP messages 102, RTCP messages 104, and DTMF (dual tone multi-frequency) messages 106, are carried in the dedicated PDTCH bursts 108. In other embodiments, instead of using dedicated physical channels, PDTCH is carried on a shared physical channel (a shared time slot or time slots of a frame), with an increase in post-dial delay time.

In one arrangement, referred to as an optimized speech bearer arrangement, speech frames 110 are carried in the dedicated traffic channel (TCH) burst 112. In addition, SID (silence descriptor) frames 114, which are transmitted during periods of silence over the wireless network, are also carried in the TCH burst 112. In an alternative arrangement, instead of carrying the speech frames 110 and SID frames 114 in a TCH burst 112, the speech frames 110 and SID frames 114 are carried in PDTCH bursts 108. This alternative arrangement is referred to as a shared arrangement.

Radio resource (RR) management messages 116 are carried in a PACCH burst 118, SACCH burst 120, or FACCH burst 122. The PACCH burst 118 is used to carry RR messages 116 during call setups. The SACCH and FACCH bursts 120 and 122 carry associated control messages after call setup, during a call session. Timing advance and retard messages 124 are carried in PTCCH bursts 126. Such messages are not transparent to the radio access network. In an alternative embodiment, some of the RR messages 116 can also be carried in the dedicated PDTCH bursts 108.

If the radio access network is a UTRAN, then another logical combination (called a transport channel combination) is defined to map the above messages and signals onto UTRAN dedicated physical channels. Packet-switched call control signals such as SIP, RSVP, and the like are assigned different channelization codes and/or scrambling sequences than those assigned to speech bearer data.

In one embodiment, two groups of radio bearers (RBs) are defined, a first group (e.g., RBs 5–31) and a second group (e.g., RBs 0–4, otherwise known as signaling RBs or SRBs). The first group of RBs are used to communicate data that are subject to a primary Packet Data Protocol (PDP) context. A PDP context may contain the following information. A PDP type may be specified, which may identify IP, X.25, or PPP (Point-to-Point Protocol) as the packet data protocol. The PDP address is also contained in the PDP context, as is a quality-of-service (QoS) profile that identifies the QoS profile requested or negotiated for a given flow. When a communications session is first established, a primary PDP context is activated, which contains the default QoS profile.

While the first group of RBs are used to carry data that are subject to QoS specified in the primary PDP context, the second group of RBs (SRBs) are used to carry signaling data with QoS requirements already reserved. Thus, in the example of FIG. 2, the PDTCH and TCH bursts 108 and 112 are carried in the first group of RBs, while the control signaling (RR messages 116 and timing advance and retard messages 124) are carried in the second group of RBs (SRBs).

Depending on whether a full-rate call or a half-rate call is set up, one of the following logical channel combinations is assigned:

TCH/F+FACCH/F+SACCH/F+PDTCH/F+PACCH/F+ PTCCH (full-rate call), and

TCH/H+FACCH/H+SACCH/H+PDTCH/H+PACCH/H+ PTCCH (half-rate call).

PTCCH bursts only need to be transmitted or configured every 16 26-multiframes. A multiframe is used to communicate control and traffic signaling between mobile stations and base stations. In one arrangement, each multiframe includes 52 frames, with each frame containing eight time slots. A multiframe starts with frame FN0 and ends with frame FN51. Four frames make up a block. In some embodiments, the PTCCH may not be needed. Also, in some embodiments, both the FACCH and PACCH may not be needed (one or the other may be sufficient).

By using PDTCH mapped to a dedicated physical channel to carry packet-based control signaling and TCH mapped to the same physical channel to carry speech bearer data, an efficient mechanism is provided to set up and tear down packet-switched call sessions over a radio access network, such as GERAN or UTRAN.

Figure 3:
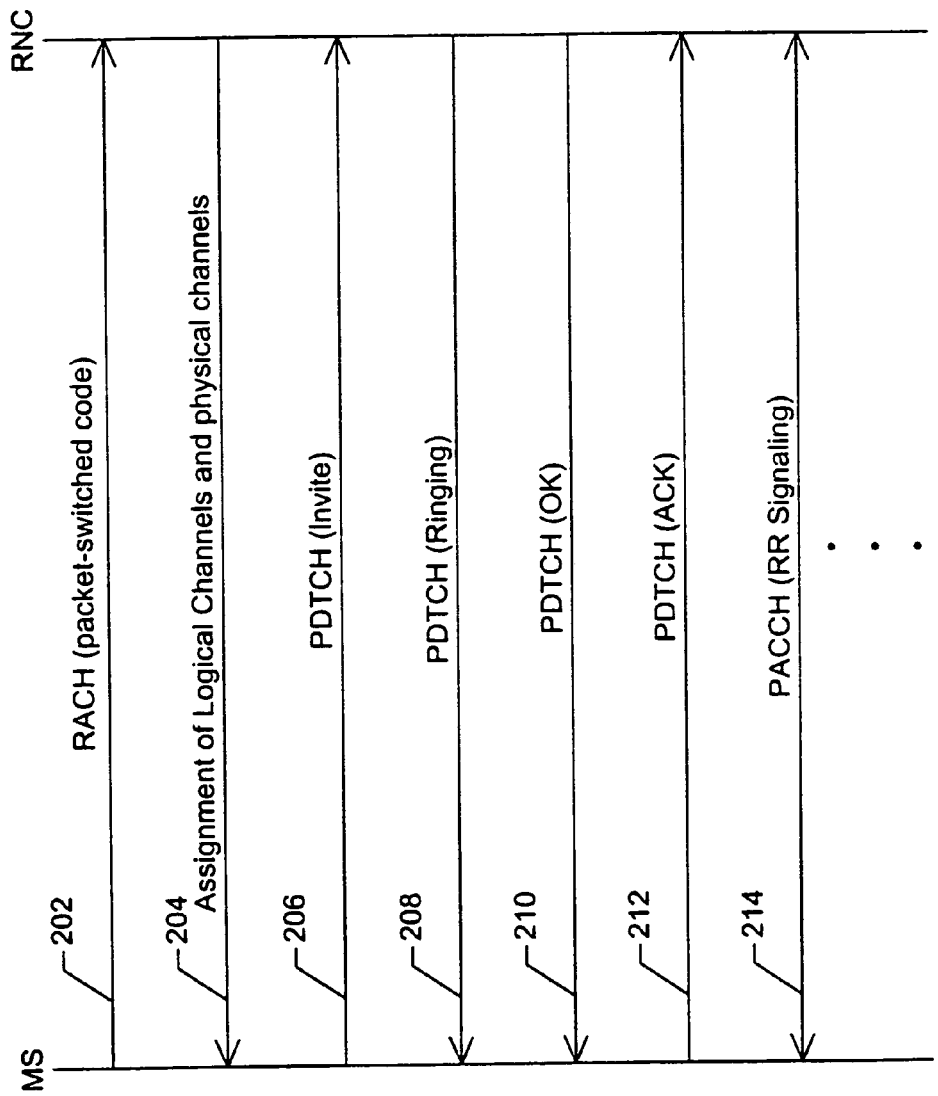
FIG. 3 is a message flow diagram between a mobile station and a radio network controller (RNC) to perform call setup in accordance with an embodiment.
Figure 7A:
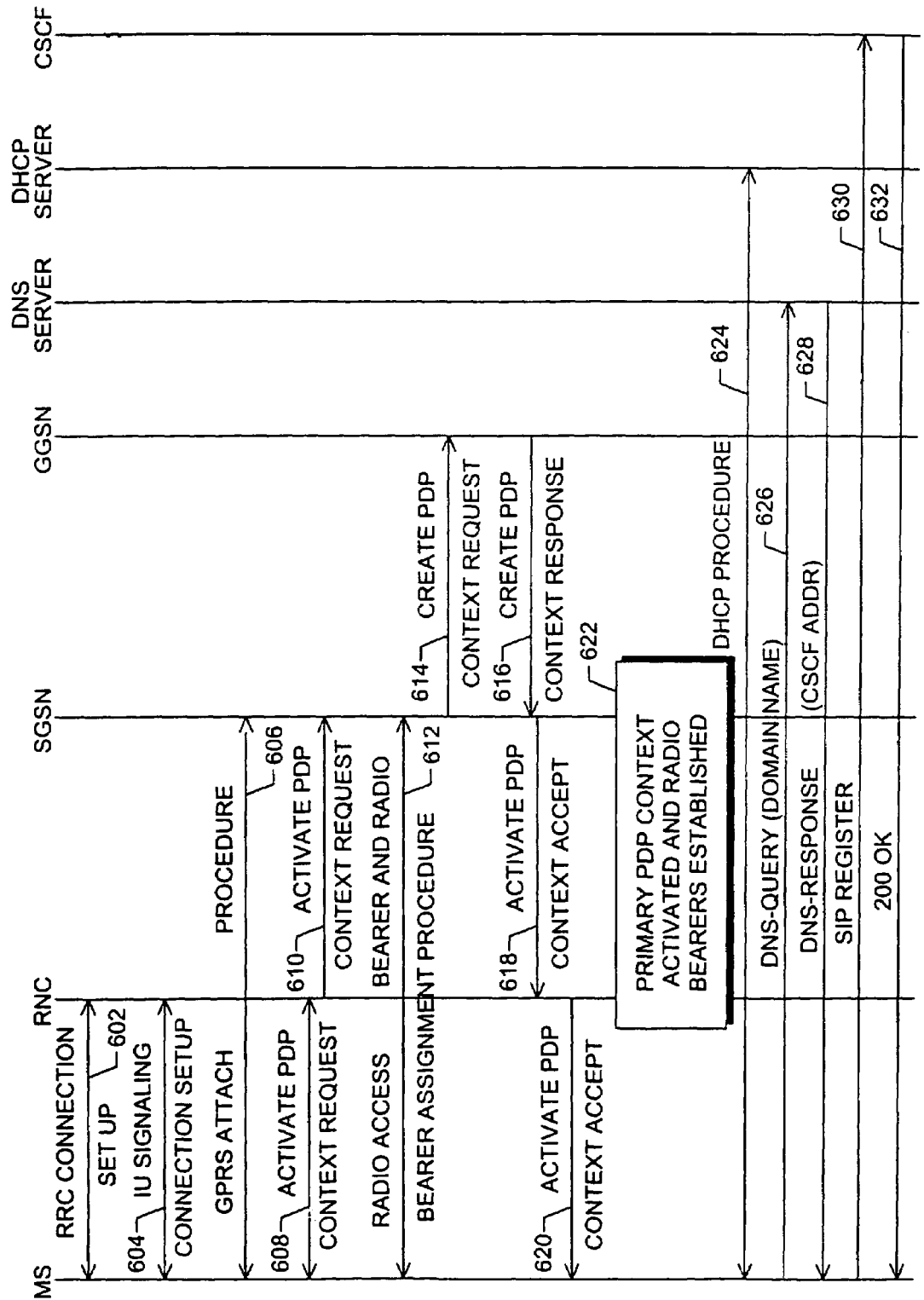
FIGS. 7A–7C are a message flow diagram of a call setup sequence according to another embodiment.
Figure 7B:
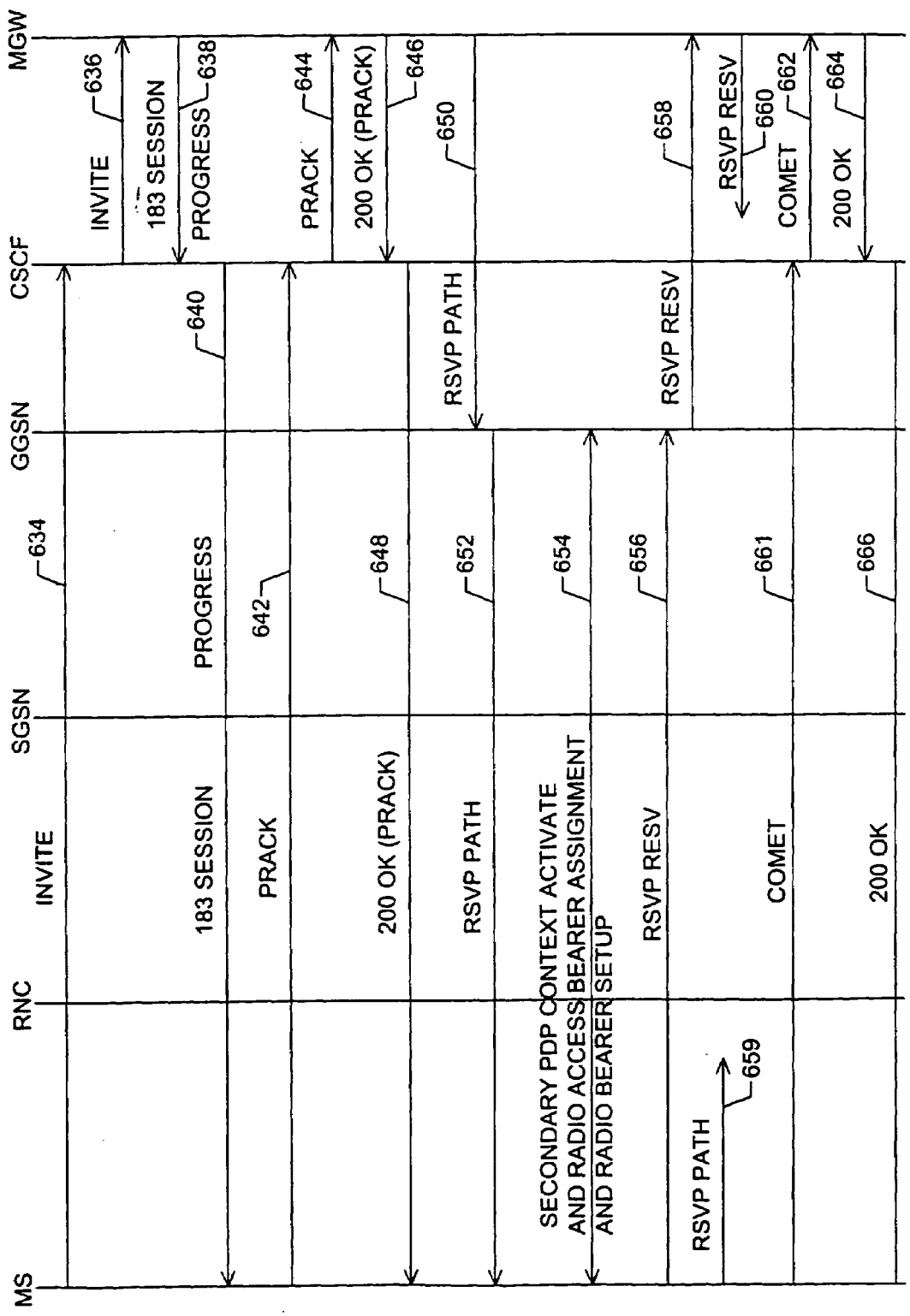
Figure 7C:
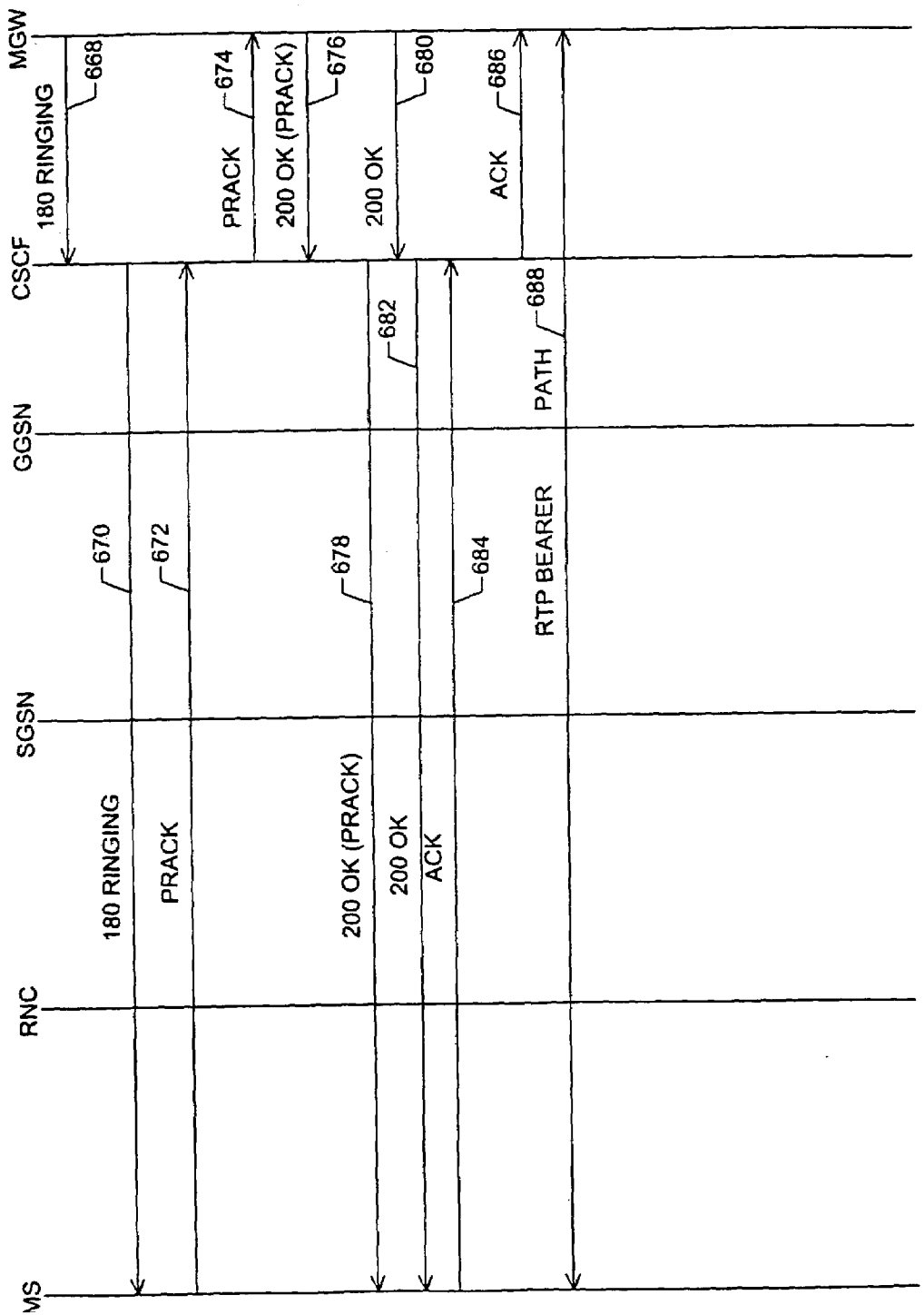

Referring to FIG. 3, a simplified message flow for setting up a packet-switched call between a mobile station 20 and a terminal (e.g., 40, 42, or 33) on the packet-switched data network 32 is illustrated. FIGS. 7A–7C describe a more detailed call setup flow (below). FIG. 3 shows the exchange of messages between the mobile station and the radio network controller (RNC). The RNC forwards the control messages to the SGSN 35. Control messages related to the radio access network are processed by the SGSN 35, while SIP messages are communicated to the data network 32 and processed by SIP proxies and one or more terminals involved in the call.

According to one embodiment, to initiate a call, the mobile station 20 sends an RACH burst (at 202) to the RNC to perform a channel request. The mobile station 20 can also send an RACH burst to answer a page. For a packet-switched call, the RACH contains one of the packet-switched MS codes noted above. Instead of RACH, a PRACH or CPRACH burst can also be used. In response, the RNC communicates via an access grant channel (at 204) a dedicated physical traffic channel or time slot that is capable of supporting an assignment of the logical channel combination and physical channel for packet-switched calls. The assignment of the logical channel combination enables the mobile station 20 to perform communication of SIP messaging using PDTCH mapped to a dedicated physical channel.

Next, the mobile station sends (at 206) an initial PDTCH burst that contains a SIP Invite request, as encapsulated in an IP packet with associated IP and UDP headers. The Invite request includes the destination address of the terminal being called and indicates that the called terminal is being invited to participate in a call session. The RNC sends the burst to the SGSN 35, which sends the SIP Invite message encapsulated in an IP packet through the GGSN 36 to the CSCF module 41. The Invite request is processed by the CSCF module 41, which resolve the logical address contained in the Invite request to identify the location of the called terminal. Depending on the location of the destination terminal, the CSCF module 41 generates signaling to establish the call over the data network 32 or over the PSTN 16.

A SIP Ringing response is returned from the called terminal once it has been located and has received the Invite request. The Ringing response communicated back through the CSCF module 41, the GGSN 36, the SGSN 35, and the RNC, which transmits the Ringing response in another PDTCH burst (at 208) to the mobile station 20. If the call has been accepted by the called terminal, the called terminal returns a SIP OK response, which is forwarded by the base station (at 210) in a PDTCH burst. In response to the OK response, the mobile station sends (at 212) a PDTCH burst carrying a SIP ACK message to acknowledge the OK response. At this point, the call has been set up and communication of voice or other real-time data can proceed. In addition, RR management signaling carried in PACCH is exchanged (at 214) between the mobile station and the RNC, such as to perform neighboring cell signal strength measurements.

In addition, for optimized voice bearer, certain parameters (e.g., UDP port number, IP destination address, and so forth) used for the construction of RTP/UDP/IP headers by both the mobile station and RNC are transmitted on both the uplink and downlink in a PACCH burst.

Figure 4:
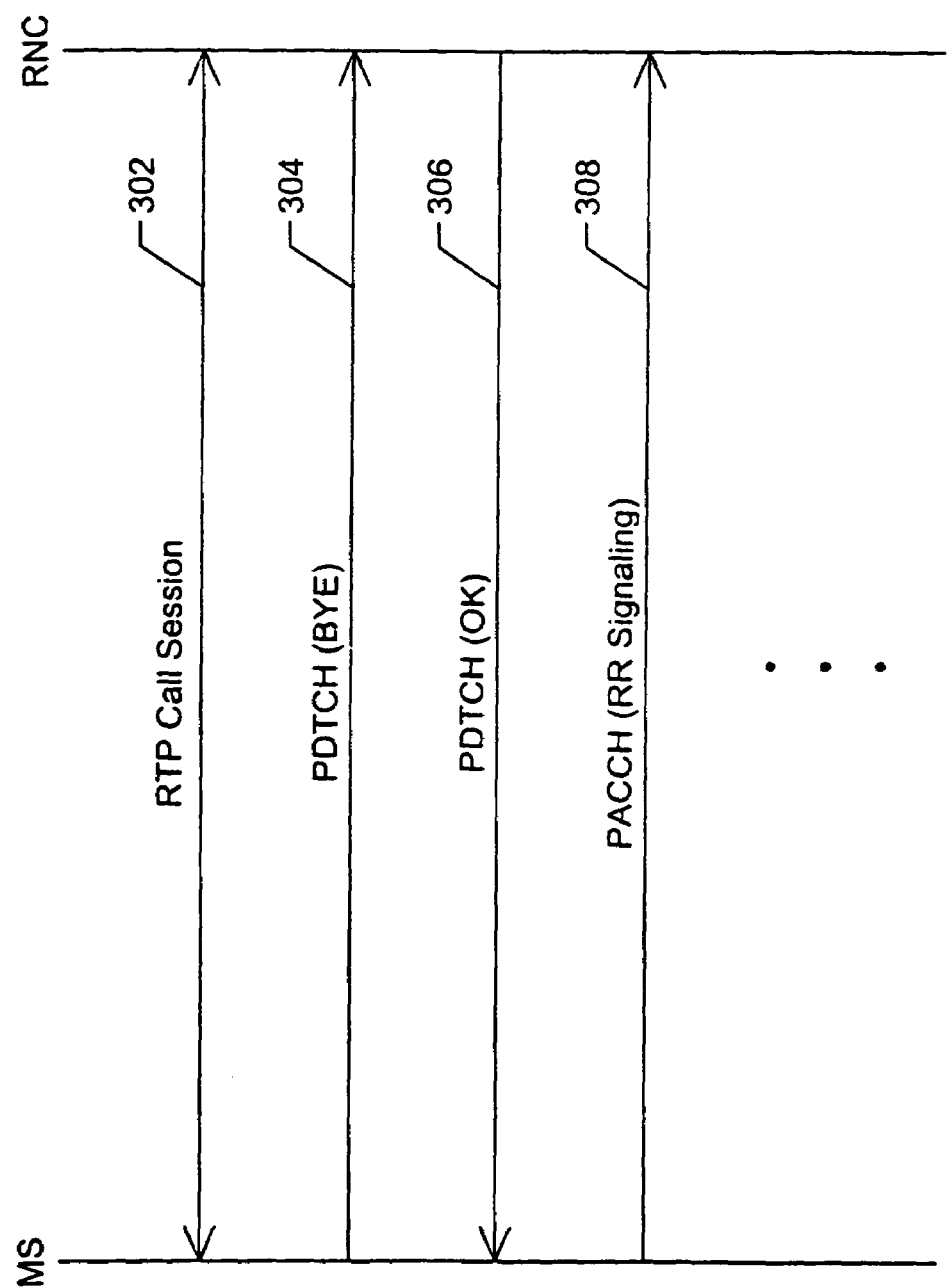
FIG. 4 is a message flow diagram of a sequence to release a call session in accordance with an embodiment.

Referring to FIG. 4, after a call session such as an RTP call session has been set up (at 302) using the mechanism discussed above, one of the terminals involved can release the call. In the example of FIG. 4, the mobile station initiates the release of the call. To do so, the mobile station sends a PDTCH burst carrying the SIP Bye message (at 304) to the RNC, which forwards the PDTCH burst to the SGSN 35.

The Bye request is processed by CSCF module 41, which forwards the Bye request to the target terminal. The target terminal returns a SIP OK response through the CSCF module 41 and the GGSN 36 to the SGSN 35. The OK response is communicated to the RNC, which communicates the OK response in a PDTCH burst (at 306) to the mobile station. Following reception of the OK message from the RNC, the mobile station sends a PACCH burst with the appropriate RR management signaling (at 308) to indicate to the radio access network that the call session has terminated. This allows the radio access network to free up the channels used during the call session for other calls.

Figure 5:
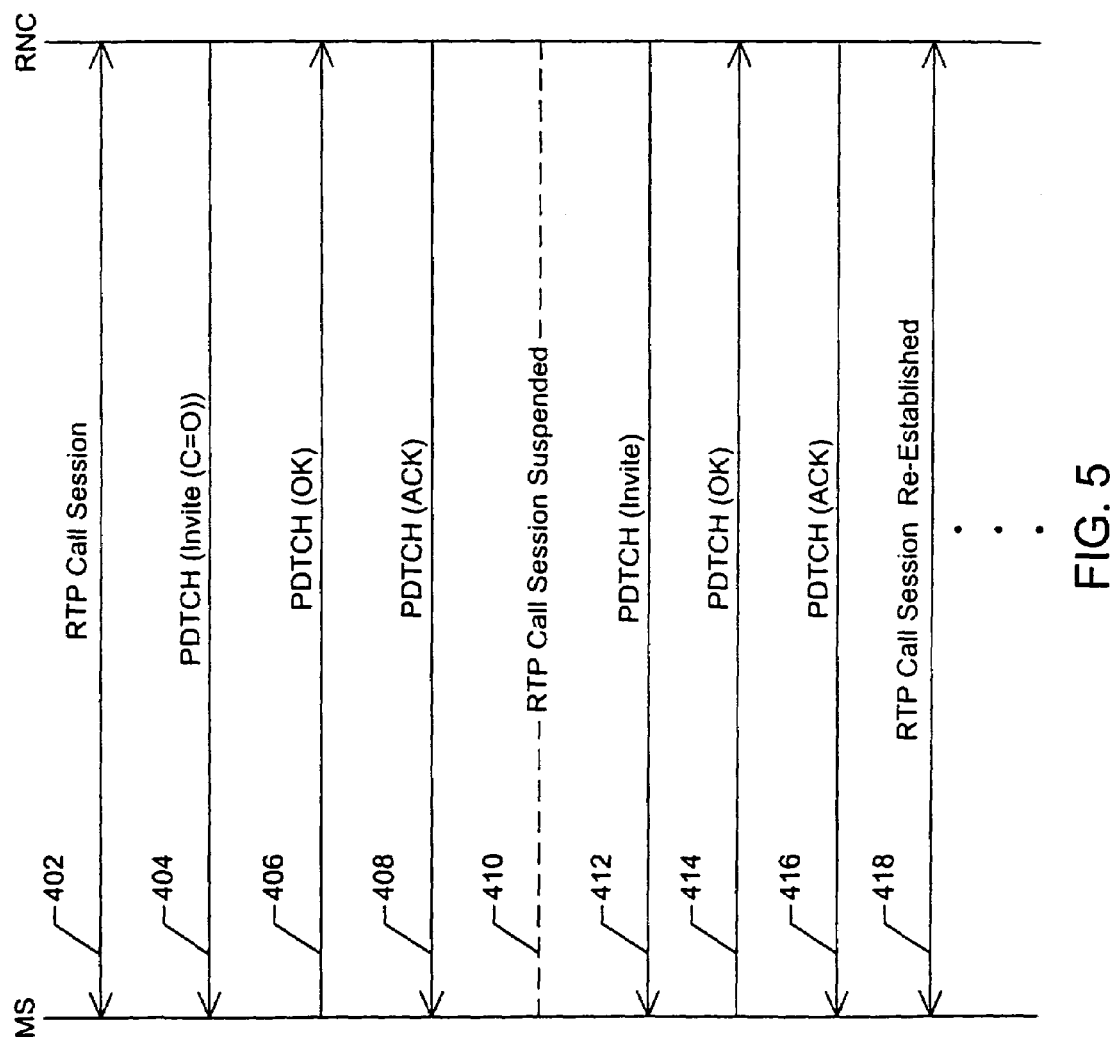
FIG. 5 is a message flow diagram of a sequence to place a call on hold in accordance with an embodiment.

In addition to call setup and release, PDTCH bursts can also be used to carry SIP signaling for performing supplementary services, such as call hold, multi-party conferencing, and so forth. Referring to FIG. 5, an example of a call hold sequence is illustrated. An RTP call session is established (at 402) between the mobile station and a remote station through the radio access network. The remote terminal may place the mobile station on hold, which is accomplished by sending a SIP Invite request with c=0 (in other words, the IP address is 0.0.0.0 in one example arrangement) (at 404). This is carried in the PDTCH burst from the RNC to the mobile station. The mobile station acknowledges the Invite request with an OK message communicated in a PDTCH burst at 406 back to the base station, which is forwarded to the remote terminal through the radio access network and the data network 32. The remote terminal then returns a SIP ACK message, which is communicated by the RNC to the mobile station (at 408) in a PDTCH message carrying the ACK message. At this point, the RTP call session is suspended (at 410).

Once the remote terminal is ready to take the mobile station off hold, it sends another Invite request (containing a real IP address), which is forwarded by the base station (at 412) in a PDTCH burst to the mobile station. The mobile station returns an OK response, carried in a PDTCH burst (at 414). The remote terminal, upon receiving the OK response, sends an ACK request, which is communicated by the base station in a PDTCH burst (at 416). At this point, the RTP call session is re-established (at 418).

Referring to FIGS. 7A–7C, a more detailed message flow to perform a call setup between a mobile station and an endpoint coupled to the data network 32 is illustrated. The mobile station first performs a radio resource control (RRC) connection setup (at 602) and an In signaling connection setup (at 604) with the RNC. Next, the mobile station performs a GPRS attach procedure (at 606). The attach procedure is performed to inform the radio access network that the mobile station is available. To activate the primary PDP context, the mobile station sends (at 608) an Activate PDP Context request to the RNC, which forwards (at 610) the request to the SGSN 35. In response, the SGSN 35 performs a radio access bearer assignment procedure (at 612) to assign one or more radio access bearers to the mobile station.

Once the one or more radio bearers have been set up, the SGSN 35 sends (at 614) a Create PDP Context request to the GGSN 36. The GGSN 36 responds with a Create PDP Context response (at 616) to the SGSN 35. When the SGSN 35 receives the Create PDP Context response, the SGSN 35 sends an Activate PDP Context Accept message (at 618) to the RNC, which forwards the Accept message (at 620) to the mobile station. At this point, a primary PDP context has been activated and radio bearers have been assigned. Up to this point, the procedures performed from 602 to 620 are according to a typical setup procedure performed among the mobile station, RNC, SGSN 35, and GGSN 36.

Once the primary PDP context has been established, PDTCH bursts can be used to carry various types of control signaling, including SIP signaling and other signaling. For example, as further shown, the mobile station can perform a Dynamic Host Configuration Protocol (DHCP) procedure (at 624), in which the mobile station obtains configuration information from a DHCP server. The configuration information includes the IP address of the mobile station. DHCP is described in RFC 1541, entitled "Dynamic Host Configuration Protocol," dated October 1993. DHCP messages can be carried in PDTCH bursts between mobile stations and RNC, in accordance with some embodiments.

During the DHCP procedure 624, the mobile station receives a domain name of the CSCF module 41. To discover the IP address of the CSCF module 41, the mobile station sends (at 626) a DNS-Query to a DNS server. In response, the DNS server sends (at 628) a DNS-Response back to the mobile station, the DNS-Response containing the IP address of the CSCF module 41. The DNS-Query and DNS-Response messages can be carried in PDTCH bursts, in accordance with some embodiments.

To enable call establishment using SIP, a SIP Register request is typically communicated. The SIP Register request may be sent to the well-known "all SIP servers" multicast address, "sip.mcast.net", for example. However, since the address of the CSCF module 41 is known, the mobile station sends the SIP Register request (at 630) to the CSCF module 41. The Register request may include several fields, including a "To:" field that contains the address-of-record whose registration is to be created or updated; a "From:" field that contains the address-of-record of the entity responsible for the registration; and a "Request URI:" field that names the destination of the registration request. In response to the SIP Register request, the CSCF module 41 registers the location of the mobile station and sends back a SIP OK response (at 632) to the mobile station.

At this point, the mobile station is able to perform a call setup, which is initiated by the mobile station sending a SIP Invite request (at 634) to the CSCF module 41. The Invite request is communicated in a dedicated PDTCH burst between the mobile station and the RNC, in accordance with some embodiments. The CSCF module 41 forwards the SIP Invite request (at 636) to the network endpoint coupled to the data network 32, which can be the media gateway 33 (FIG. 1) or other endpoint. In response, the network endpoint (assumed to be the media gateway in this example) sends (at 638) a SIP 183 Session Progress message to indicate that the network endpoint has sufficient resources to respond to the call request. The SIP 183 Session Progress message is forwarded (at 640) by the CSCF module 41 to the mobile station. Between the RNC and the mobile station, the SIP 183 Session Progress message is carried in the dedicated PDTCH burst.

In response to the SIP 183 message, the mobile station sends (at 642) a provisional acknowledge (PRACK) response back to the CSCF module 41. The PRACK response is forwarded (at 644) to the network endpoint. The network endpoint then sends (at 646) a 200 OK response back to the CSCF module 41, which forwards (at 648) a 200 OK response to the mobile station. The PRACK and OK messages are also carried in dedicated PDTCH bursts between the RNC and the mobile station.

To establish a downlink flow with a desired quality of service (QoS), the network endpoint sends (at 650) an RSVP PATH message to the GGSN 36. The RSVP PATH message contains the Sender_Tspec information, which specifies the traffic profile expected to be generated by the network endpoint. The GGSN 36 forwards (at 652) the RSVP PATH message to the mobile station. Between the RNC and the mobile station, the RSVP messages are carried in dedicated PDTCH bursts, in accordance with some embodiments.

If the primary PDP context already established for the mobile station is unable to provide the QoS requested in the RSVP PATH message, the mobile station can establish a secondary PDP context. Given a primary PDP context, a mobile station can activate one or more secondary PDP contexts with different QoS profiles as and when required. A secondary PDP context activate procedure and a radio access bearer assignment and radio bearer setup procedure are performed (at 654) between the mobile station and the GGSN 36.

Once the secondary PDP context that provides the desired QoS level is established, the mobile station sends (at 656) an RSVP RESV message in response to the RSVP PATH message. The RSVP RESV message is received by the GGSN 36, which forwards (at 658) the RSVP RESV message to the network endpoint. Again, the RSVP RESV message is carried in a dedicated PDTCH burst.

The RSVP process described above is also performed in the reverse direction to establish an uplink flow with desired QoS. This is illustrated by an RSVP PATH message originated by the mobile station and transmitted (at 659). In response, the network endpoint sends an RSVP RESV message (at 660). Based on the downlink RSVP process, a procedure to modify the secondary PDP context can also be performed, if needed.

The mobile station then sends (at 661) a COMET message to the CSCF module 41 to indicate that the conditions are met. The COMET message is forwarded (at 662) to the network endpoint. In response, the network endpoint sends (at 664) a 200 OK message to the CSCF module 41, which forwards (at 666) the 200 OK response to the mobile station. Between the RNC and the mobile station, the COMET and 200 OK messages are carried in dedicated PDTCH bursts.

At this point, the network endpoint is ready to respond to the mobile station. A SIP 180 Ringing response is sent (at 668) to the CSCF module 41, which forwards (at 670) the Ringing response to the mobile station. A PRACK message is then sent (at 672) from the mobile station to the CSCF module 41, which forwards (at 674) the PRACK message to the network endpoint. In response, the network endpoint returns (at 676) a 200 OK (PRACK) response, which is forwarded (at 678) by the CSCF module 41 to the mobile station. Following this, the network endpoint also sends (at 680) a 200 OK responding to the SIP Invite request communicated at 634. The 200 OK response is forwarded (at 682) by the CSCF module 41 to the mobile station. The mobile station then sends a SIP Ack message (at 680) back to the CSCF module 41, which forwards (at 682) the Ack message to the network endpoint. The messages exchanged between 660 and 682 are all carried in PDTCH bursts.

When the Ack response is received, an RTP bearer path is set up (at 684) between the mobile station and the network endpoint. Voice and other real-time traffic is carried between the mobile station and the network endpoint over the RTP bearer path.

The following describes the performance of packet-switched calls using techniques according to some embodiments compared to GSM circuit-switched calls. Traffic flow through a cell site is defined as the product of the number of calls during a specific period of time, N, and the average duration of the call, T. In traffic theory, the unit of time generally considered is a period of one hour. Therefore, the number of calls, N, can be expressed in terms of the arrival rate, λ (number of calls per unit time), and the average duration of the call, T, can be expressed in terms of unit time per call. The traffic intensity, A, (in Erlangs) is given by:

$$A = \frac{\lambda T}{3600},$$

where λ is in units of "calls per busy hour" and T is in units of "seconds."

For a 4/12 frequency reuse pattern and a bandwidth of 15 MHz, the following number of channels per sector is available:

$$CH = \frac{(15000 \text{ kHz})(8)}{(12)(200 \text{ kHz})} = 50.$$

For the GSM circuit-switched call setup sequence, it is assumed that logical channel combination VII (which requires one time slot) is used to support the mapping of SDCCHs onto basic physical channels.

VII SDCCH/8 (0 . . . 7)+SACCH/8 (0 . . . 7)

In addition to that, logical channel combination IV (which also requires one time slot) is used for the beacon carrier.

IV FCCH+SCH+BCCH+CCCH

Therefore, for a GSM circuit-switched call setup sequence, the number of channels per sector for a 4/12 frequency reuse pattern and a bandwidth of 15 MHz is 48.

For the SIP call setup sequence, it is assumed that logical channel combination IV (which requires one time slot) or XI (which requires one time slot) is used for either the beacon carrier or the COMPACT CPBCCH carrier.

IV FCCH+SCH+BCCH+CCCH

XI PFCCH+PSCH+CPBCCH+CPCCCH+PDTCH+PACCH+PTCCH

Therefore, for a SIP call setup sequence, the number of channels per sector for a 4/12 frequency reuse pattern and a bandwidth of 15 MHz is 49.

In some instances, systems implementing the packet-switched call setup procedure using SIP in accordance with some embodiments are more spectrally efficient than systems implementing the GSM circuit-switched call setup procedure using RIL3-CC, RIL3-MM, RIL3-RR, and DTAP, as discussed below. Blocking is the failure of calls due to an insufficient number of channels being available. For example, a blocking value of 0.02 means that there are two calls blocked for every 100 calls attempted. Table 1 illustrates a comparison between the blocking values for the typical GSM circuit-switched call setup sequence and the typical SIP call setup sequence in one example arrangement.

| | Blocking 2% | |
|---|---|---|
| T (average duration of call) | λ (calls per busy hour) | |
| (sec) | GSM | SIP (using MCS-1) |
| 120 | 1150 | 1140 |
| 300 | 460 | 465 |
| 600 | 230 | 234 |
| 1200 | 115 | 117 |

Thus, as illustrated in the example of Table 1, systems implementing the packet-switched call setup procedure using SIP can be slightly more spectrally efficient than systems implementing the GSM circuit-switched call setup procedures using RIL3-CC, RIL3-MM, RIL3-RR, and DTAP for average call durations that are greater than about 120 seconds. However, the advantage of SIP call setup may be reduced once the additional radio resource management messages for SIP call setup are taken into account. Also, there may be some extra radio resource management signaling for secondary PDP context activation.

Spectral efficiency of a typical SIP call setup/call release sequence can further be improved by compressing the UDP/IP header on SIP request methods and response codes that are communicated during a typical SIP call setup/call release sequence. Also spectral efficiency can be improved by using coding schemes MCS-2 through MCS-9. Finally, if a simple tokenization technique is implemented, the size of the SIP request methods and response codes can be reduced by approximately 12%.

Figure 8:
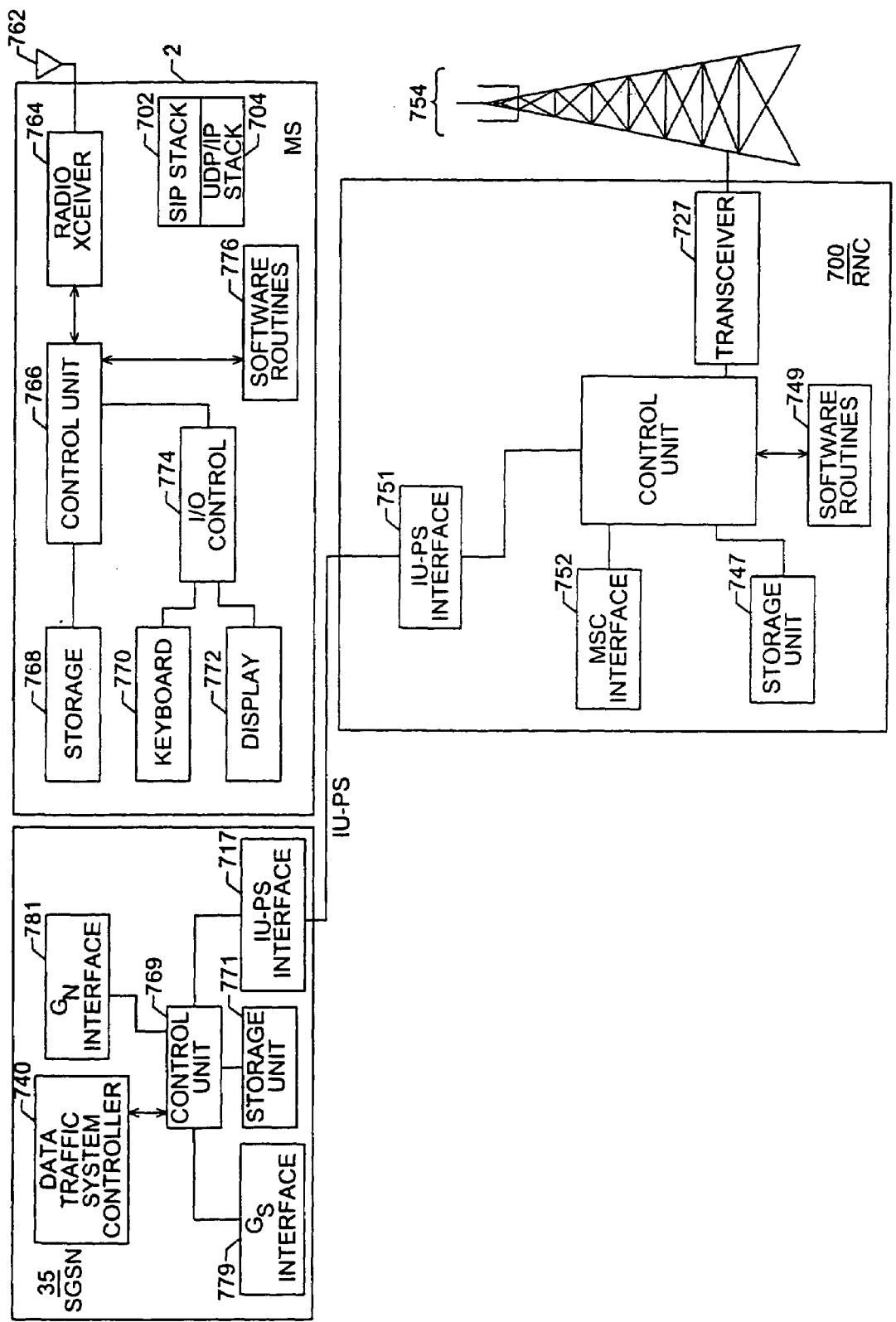
FIG. 8 is a block diagram of components of the communications system of FIG. 1.

Referring to FIG. 8, components of a radio network controller 700, the data traffic service node 35, and a mobile unit 20 are illustrated. Such components are for illustrative purposes and are not intended to limit the scope of the invention. In further embodiments, other architectures of such components may be possible. For example, the radio network controller 700 may actually include several platforms, such as a base station and a base station controller. In the radio network controller 700, a transceiver 727 is connected to an antenna tower 754 that transmits and receives carriers 26. The transceiver 727 is connected to a control unit 750 (or plural control units), on which various software routines 749 may be executable. A storage unit 747 (or plural storage units) may also be connected to the control unit 750. Further, the radio network controller 700 includes an MSC interface 752 that is coupled to a link 764 (e.g., a Ti link) that is in turn coupled to an MSC. The radio access controller 700 also includes an interface 751 (which in one embodiment is an Iu-ps interface 751 according to EGPRS or EGPRS COMPACT) for communicating over a link (e.g., an Iu-ps link) to the SGSN 35.

The SGSN 35 includes interface units 777 and 779 for communicating over the Iu-ps and Gs links, respectively, in one embodiment. The processing core of the data traffic service node 35 includes a control unit 769 (or plural control units). A storage unit 771 (or plural storage units) is coupled to the control unit 769. Routines and modules that make up a data traffic system controller 740 may be initially stored in the storage unit 771 and loaded by the control unit 769 for execution. The SGSN 35 further includes an interface 781 (e.g., a Gn interface) for communicating with the GGSN 36 (FIG. 1). In another embodiment, the interface 781 may be a network interface controller or other transceiver capable of communicating over the data network 32.

Carriers are communicated between the antennas 754 coupled to the radio network controller 700 and an antenna 762 of a mobile station 20. In one example arrangement of the mobile station 20, a radio transceiver 764 is connected to the antenna 762 to send and receive carriers 26. A control unit 766 (or plural control units) may be coupled to the one or more radio transceivers 764. The control unit 766 is coupled to a storage unit 768 (or plural storage units). Software routines 768 executable on the control unit 766 may be initially stored in a non-volatile portion of the storage unit 768. An input/output (I/O) controller 774 is coupled to the keyboard 770 and display 772 of the mobile station 20.

To support communication of IP packets and SIP messages, the mobile station 20 further includes a UDP/IP stack 704 as well as a SIP stack 702. On the transmit side, the UDP/IP stack 704 adds appropriate UDP and IP headers for encapsulation in an IP packet. On the receive side, the UDP/IP stack 704 extracts the payload information, e.g., a SIP message, from a received IP packet. The SIP stack 702 is a state machine that provides parsing, processing, and generation of SIP requests and responses. Other modules are also present in the mobile station 20, including an RSVP agent and modules capable of generating and receiving DHCP and DNS messages.

The various software layers, routines, or modules described herein may be executable on various processing elements, such as control units discussed above. Each control unit may include a microprocessor, a microcontroller, a processor card (including one or more microprocessors or microcontrollers), or other control or computing devices. As used here, a "controller" can refer to either hardware or software or a combination of the two. A "controller" can also refer to a single component or to plural components (either hardware or software).

A storage unit includes one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs or digital video disks (DVDs). Instructions that make up the various software layers, routines or modules in the various network elements are stored in respective storage units. The instructions when executed by a respective control unit cause the corresponding station or system to perform programmed acts.

The instructions of the software layers, routines or modules are transported to the station or system in one of many different ways. For example, code segments including instructions stored on floppy disks, CD or DVD media, a hard disk, or transported through a network interface card, modem, or other interface device are loaded into the system and executed as corresponding software layers, routines, or modules. In the loading or transport process, data signals that are embodied in carrier waves (transmitted over telephone lines, network lines, wireless links, cables, and the like) communicate the code segments, including instructions, to the network element. Such carrier waves are be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of establishing a call in a wireless network, comprising:
   sending a request for a packet-switched call over the wireless network;
   communicating control signaling in a traffic channel of the wireless network to establish the packet-switched call; and
   retrieving a pre-assigned code to send in the request,
   wherein retrieving the pre-assigned code comprises retrieving a random access channel mobile station code.

2. A method of establishing a call in a wireless network, comprising:
   sending a request for a packet-switched call over the wireless network; and
   communicating control signaling in a traffic channel of the wireless network to establish the packet-switched call,
   wherein communicating the control signaling comprises communicating the control signaling in a packet data traffic channel mapped to a dedicated physical channel.

3. The method of claim 2, further comprising communicating bearer traffic in another traffic channel mapped to the dedicated physical channel.

4. The method of claim 3, wherein communicating the control signaling comprises communicating the control signaling in a PDTCH, and wherein communicating the bearer traffic comprises communicating the bearer traffic in a TCH, the PDTCH and TCH defined according to an Enhanced General Packet Radio Services protocol.

5. A method of establishing a call in a wireless network, comprising:
   sending a request in a random access channel for a packet-switched call over the wireless network; and
   communicating control signaling in a traffic channel of the wireless network to establish the packet-switched call,
   wherein communicating the control signaling comprises communicating Session Initiation Protocol messages in the traffic channel.

6. The method of claim 5, wherein sending the request comprises sending a predefined code in the random access channel of an Enhanced General Packet Radio Services system.

7. The method of claim 6, wherein sending the code comprises sending the code in a channel selected from the group consisting of a RACH, PRACH, and CPRACH.

8. The method of claim 5, wherein communicating the control signaling comprises communicating the control signaling in a packet data traffic channel.

9. The method of claim 8, wherein communicating the control signaling comprises communicating the control signaling in PDTCH bursts of an Enhanced General Packet Radio Services system.

10. The method of claim 5, wherein communicating the control signaling comprises communicating a Session Initiation Protocol Invite request in the traffic channel.

11. A method of establishing a call in a wireless network, comprising:
    sending a request in a random access channel for a packet-switched call over the wireless network;
    communicating control signaling in a traffic channel of the wireless network to establish the packet-switched call; and
    sending a release message to terminate the packet-switched call in a traffic channel,
    wherein sending the release message comprises sending a Session Initiation Protocol Bye message in the traffic channel.

12. A method of establishing a call in a wireless network, comprising:
    sending a request for a packet-switched call over the wireless network;
    communicating control signaling in a traffic channel of the wireless network to establish the packet-switched call; and
    sending quality-of-service related messages in a traffic channel, wherein sending the quality-of-service related messages comprises sending Resource Reservation Protocol messages.

13. A method of establishing a call in a wireless network, comprising:
sending a request for a packet-switched call over the wireless network; and
communicating control signaling in a traffic channel of the wireless network to establish the packet-switched call,
wherein communicating the control signaling comprises communicating Session Initiation Protocol messages in the traffic channel,
wherein communicating the control signaling comprises communicating the control signaling in PDTCH bursts, the method further comprising communicating bearer traffic in TCH bursts.

14. A method of establishing a call in a wireless network, comprising:
sending a request for a packet-switched call over the wireless network; and
communicating control signaling in a traffic channel of the wireless network to establish the packet-switched call,
wherein communicating the control signaling comprises communicating Session Initiation Protocol messages in the traffic channel,
wherein communicating the control signaling comprises communicating the control signaling in PDTCH bursts, the method further comprising communicating bearer traffic in PDTCH bursts.

15. An article comprising one or more storage media containing instructions that when executed cause a controller to:
send control signaling to request a channel for a packet-switched call over a wireless network;
add a predetermined code into the control signaling to identify the call as a packet-switched call; and
communicate packet-switched call control signaling in traffic channels of the wireless network,
wherein the instructions when executed cause the controller to communicate the packet-switched call control signaling by communicating Session Initiation Protocol messages in traffic channels of the wireless network.

16. The article of claim 15, wherein the instructions when executed cause the controller to send the control signaling selected from the group consisting of RACH, PRACH, and CPRACH.

17. The article of claim 15, wherein the instructions when executed cause the controller to communicate the Session Initiation Protocol messages in PDTCH bursts of a General Packet Radio Services system.

18. The article of claim 15, wherein the instructions when executed cause the controller to communicate a Session Initiation Protocol Invite message.

19. The article of claim 18, wherein the instructions when executed cause the controller to receive response messages to the Invite message.

20. The article of claim 15, wherein the instructions when executed cause the controller to communicate a Session Initiation Protocol Bye message to release a call.

21. The article of claim 15, wherein the instructions when executed cause the controller to communicate messages to provide a supplementary service.

22. A mobile station for use in a wireless communications system having base stations, comprising:
a storage element storing a predetermined code associated with packet-switched calls; and
a controller to send control signaling to one of the base stations over a wireless link to set up a packet-switched call,
the control signaling containing the predetermined code, the predetermined code to identify the call as a packet-switched call,
wherein the control signaling comprises a random access channel, the random access channel containing the predetermined code,
wherein the random access channel comprises a packet random access channel, the packet random access channel containing the predetermined code.

23. The mobile station of claim 22, wherein the packet random access channel comprises a COMPACT packet random access channel, the COMPACT packet random access channel containing the predetermined code.

24. A radio network control system, comprising:
an interface to a wireless link capable of communicating with a mobile station; and
a controller adapted to receive a request to set up a packet-switched call over the wireless link,
the controller further adapted to assign a logical channel combination in response to the request,
wherein the logical channel combination comprises TCH+FACCH+SACCH+PDTCH+PACCH+PTCCH.

25. The radio network control system of claim 24, wherein the controller is adapted to communicate Session Initiation Protocol messages in PDTCH bursts.

26. The radio network control system of claim 24, wherein the controller is adapted to communicate a success indication of a packet-switched call session in a PACCH burst.

27. The radio network control system of claim 24, wherein the controller is adapted to communicate radio resource management signaling in a PACCH burst to indicate a state of the packet-switched call.

28. A data signal embodied in a carrier wave and containing instructions that when executed cause a system in a wireless network to:
receive control signaling to set up a packet-switched call over the wireless network, the control signaling carried in a first traffic channel;
establish the packet-switched call over the wireless network; and
communicate bearer data in a second traffic channel.

29. The data signal of claim 28, wherein the control signaling is carried in a PDTCH and the bearer data is carried in a TCH.

30. The data signal of claim 28, wherein receiving the control signaling comprises receiving a Session Initiation Protocol message carried in the first traffic channel.

31. An article comprising one or more storage media containing instructions that when executed cause a controller to:
send control signaling to request a channel for a packet-switched call over a wireless network;
add a predetermined code into the control signaling to identify the call as a packet-switched call; and
communicate packet-switched call control signaling in traffic channels of the wireless network,
wherein the instructions when executed cause the controller to send the control signaling selected from the group consisting of RACH, PRACH, and CPRACH,
wherein the predetermined code comprises a mobile station code.

* * * * *